US009915352B2

(12) United States Patent
Pinto (10) Patent No.: US 9,915,352 B2
(45) Date of Patent: Mar. 13, 2018

(54) BUTTERFLY VALVE UTILIZING SPRING FOR CONSISTENT DISK PLACEMENT

(71) Applicant: Siemens Combustion Controls, Inc., Elk Grove Village, IL (US)

(72) Inventor: Peter S. Pinto, Wheaton, IL (US)

(73) Assignee: SCC, Inc., Elk Grove Village, IL (US)

( * ) Notice: Subject to any disclaimer, the term of this patent is extended or adjusted under 35 U.S.C. 154(b) by 107 days.

(21) Appl. No.: 15/227,636

(22) Filed: Aug. 3, 2016

(65) Prior Publication Data
US 2018/0038490 A1 Feb. 8, 2018

(51) Int. Cl.
*F16K 1/22* (2006.01)
*F16K 1/226* (2006.01)
*F16K 37/00* (2006.01)

(52) U.S. Cl.
CPC ............ *F16K 1/2266* (2013.01); *F16K 1/224* (2013.01); *F16K 37/0016* (2013.01); *Y10T 137/0525* (2015.04); *Y10T 137/6055* (2015.04); *Y10T 137/8292* (2015.04)

(58) Field of Classification Search
CPC .... F16K 1/2266; F16K 37/0016; F16K 1/224; F16K 1/22; Y10T 137/0525; Y10T 137/6048; Y10T 137/6052; Y10T 137/6055; Y10T 137/8275; Y10T 137/8292; Y10T 137/8309
USPC ....................... 251/305–308, 337; 137/15.25, 137/315.22–315.24, 556–556.6
See application file for complete search history.

(56) References Cited

U.S. PATENT DOCUMENTS

| 3,497,180 | A | | 2/1970 | Ryen et al. |
| 3,778,028 | A | * | 12/1973 | Graves .................. F16K 1/2265 |
| | | | | 137/375 |
| 4,146,206 | A | * | 3/1979 | Malloy ..................... F16K 1/22 |
| | | | | 251/306 |

(Continued)

FOREIGN PATENT DOCUMENTS

| DE | 10 13 117 B | 8/1957 |
| DE | 11 79 049 B | 10/1964 |

(Continued)

OTHER PUBLICATIONS

European Search Report related to Application No. 17164660.7 dated Oct. 12, 2016.

*Primary Examiner* — John Bastianelli
(74) *Attorney, Agent, or Firm* — Miller, Matthias & Hull LLP (57) ABSTRACT

A butterfly valve for controlling gas flow is disclosed. The butterfly valve may include a valve body, the valve body defining a bore and a shaft configured for rotatable motion with respect to the valve body and including a shoulder. The butterfly valve may further include a disk housed within the bore, operatively coupled with the shaft, and configured to control gas flow through the bore based on a rotational position of the shaft relative to the valve body. The butterfly valve may further include a ball bearing operatively coupled with the shaft and including a ball and a race. The butterfly may further includes a spring configured to provide an axial force on the shaft, the axial force configured to press the shoulder of the shaft against the race of the ball bearing to prevent an outer edge of the disk from contacting an inner wall of the bore.

20 Claims, 4 Drawing Sheets

(56) References Cited

U.S. PATENT DOCUMENTS

| | | | | |
|---|---|---|---|---|
| 4,291,863 A | * | 9/1981 | Gachot | F16K 41/026 251/214 |
| 5,370,361 A | * | 12/1994 | Mendell | F16K 1/22 251/305 |
| 6,173,939 B1 | * | 1/2001 | Dottavio | F02D 9/1065 123/339.15 |
| 2002/0134960 A1 | | 9/2002 | Zwick et al. | |
| 2006/0157663 A1 | * | 7/2006 | Rauch | F02D 9/1065 251/305 |
| 2010/0270489 A1 | * | 10/2010 | Mendoza | B64D 13/02 251/308 |
| 2014/0339452 A1 | | 11/2014 | Weis et al. | |

FOREIGN PATENT DOCUMENTS

| | | |
|---|---|---|
| DE | 10 2010 034935 A1 | 2/2011 |
| EP | 3 037 686 A1 | 6/2016 |
| JP | 2011 058536 A | 3/2011 |

* cited by examiner

BUTTERFLY VALVE UTILIZING SPRING FOR CONSISTENT DISK PLACEMENT

TECHNICAL FIELD

The present disclosure generally relates to apparatus for controlling fluid flow and, more particularly, relates to butterfly valves utilized for controlling gas flow.

BACKGROUND

Butterfly valves are commonly used to isolate and/or regulate flow of fluids, such as gases. In operation, a butterfly valve employs a rotatable disk, also referred to as the "butterfly" of the valve, which is positioned proximate to the center of a pipe or bore of the valve. The disk of the butterfly valve may be rotated by turning a shaft of the valve, with which the butterfly is, generally, operably associated. Rotation of the shaft by an outside actor (e.g., shaft rotation by an operator, shaft rotation via a crank, shaft rotation via an actuator, etc.) then causes rotation of the disk within the pipe or bore of the valve.

During use, the valve may be nearly fully opened when the disk is substantially parallel to the fluid flow of the valve and the valve may be nearly fully closed when the disk is substantially perpendicular to the flow of the valve. Accordingly, the butterfly valve can go from maximum flow capacity to minimum flow capacity with a quarter-turn (90 degrees) of the shaft.

In prior known butterfly valves, the disk may be oval in shape to maintain the shaft's placement within the valve relative to the bore, as the general oval shape can cause contact with the bore to prevent further shaft displacement. However, the shaft placement in such designs may be susceptible to inconsistent placement and/or may produce undesirable friction on one or both of the disk and the bore due to the contact. Therefore, improved butterfly valves which provide for consistent shaft and disk placement, relative to the bore, are desired.

SUMMARY

In accordance with one aspect of the disclosure, a butterfly valve for controlling gas flow is disclosed. The butterfly valve may include a valve body, the valve body defining a bore and including, at least, a first wall and a second wall, the first wall and the second wall being substantially parallel with respect to one another. The butterfly valve may further include a shaft disposed substantially perpendicular to the first and second walls and configured for rotatable motion with respect to the valve body. The shaft may include a first portion, a second portion, and a center portion, the first portion including a shoulder and intersecting with the first wall, the second portion intersecting with the second wall, and the center portion disposed within the bore. The butterfly valve may further include a disk housed within the bore, operatively coupled with the center portion of the shaft, and configured to control gas flow through the bore based on a rotational position of the shaft relative to the valve body. The butterfly valve may further include a ball bearing operatively coupled with the first portion of the shaft and disposed proximate to the first wall, the ball bearing including a ball and a race. The butterfly valve may further include a spring disposed proximate to the second wall and the second portion of the shaft and configured to provide an axial force on the shaft, the axial force configured to press the shoulder of the first portion of the shaft against the race of the ball bearing to prevent an outer edge of the disk from contacting an inner wall of the bore.

In accordance with another aspect of the disclosure, a method for manufacturing a butterfly valve, the butterfly valve for controlling gas flow, is disclosed. The method may include providing a valve body, the valve body defining a bore and including, at least, a first wall and a second wall, the first wall and the second wall being substantially parallel with respect to one another. The method may further include installing a shaft into the valve body by disposing the shaft, within the bore, substantially perpendicular to the first and second walls, disposing a first portion of the shaft to intersect with the first wall, disposing a second portion of the shaft to intersect with the second wall, and disposing a center portion of the shaft to lie within the bore, the shaft configured for rotatable motion with respect to the valve body. The method may further include installing a ball bearing proximate to the first portion of the shaft and the first wall, the ball bearing including a ball and a race. The method may further include coupling a disk, in operable fashion, with the center portion of the shaft, the disk configured to control gas flow through the bore based a rotational position of the shaft relative to the valve body. The method may further include generating an axial force upon the second portion of the shaft using a spring disposed proximate to the second portion of the shaft and the second wall, the axial force configured to press a shoulder of the first portion of the shaft against the race of the ball bearing to prevent an outer edge of the disk from contacting an inner wall of the bore.

In accordance with yet another aspect of the disclosure, an apparatus for controlling gas flow is disclosed. The apparatus may include a valve body, the valve body defining a bore and including, at least, a first wall and a second wall, the first wall and the second wall being substantially parallel with respect to one another. The apparatus may further include a shaft disposed substantially perpendicular to the first and second walls and configured for rotatable motion with respect to the valve body. The shaft may include a first portion, a second portion, and a center portion, the first portion including a shoulder and intersecting with the first wall, the second portion intersecting with the second wall, and the center portion disposed within the bore. The shaft may define a disk slot positioned proximately about a center rotational axis of the shaft. The apparatus may further include a disk housed within the bore, operatively coupled with the center portion of the shaft via the disk slot, and configured to control gas flow through the bore based on a rotational position of the shaft relative to the valve body. The apparatus may further include a ball bearing operatively coupled with the first portion of the shaft and disposed proximate to the first wall, the ball bearing including a ball and a race. The apparatus may further include a spring disposed proximate to the second wall and the second portion of the shaft and configured to provide an axial force on the shaft, the axial force configured to press the shoulder of the first portion of the shaft against the race of the ball bearing to prevent an outer edge of the disk from contacting an inner wall of the bore. The apparatus may further include a spring plug, the spring plug disposed proximate to the second portion of the shaft and the second wall, the spring plug housing the spring and, in part, the second portion.

Other features and advantages of the disclosed systems and principles will become apparent from reading the following detailed disclosure in conjunction with the included drawing figures.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
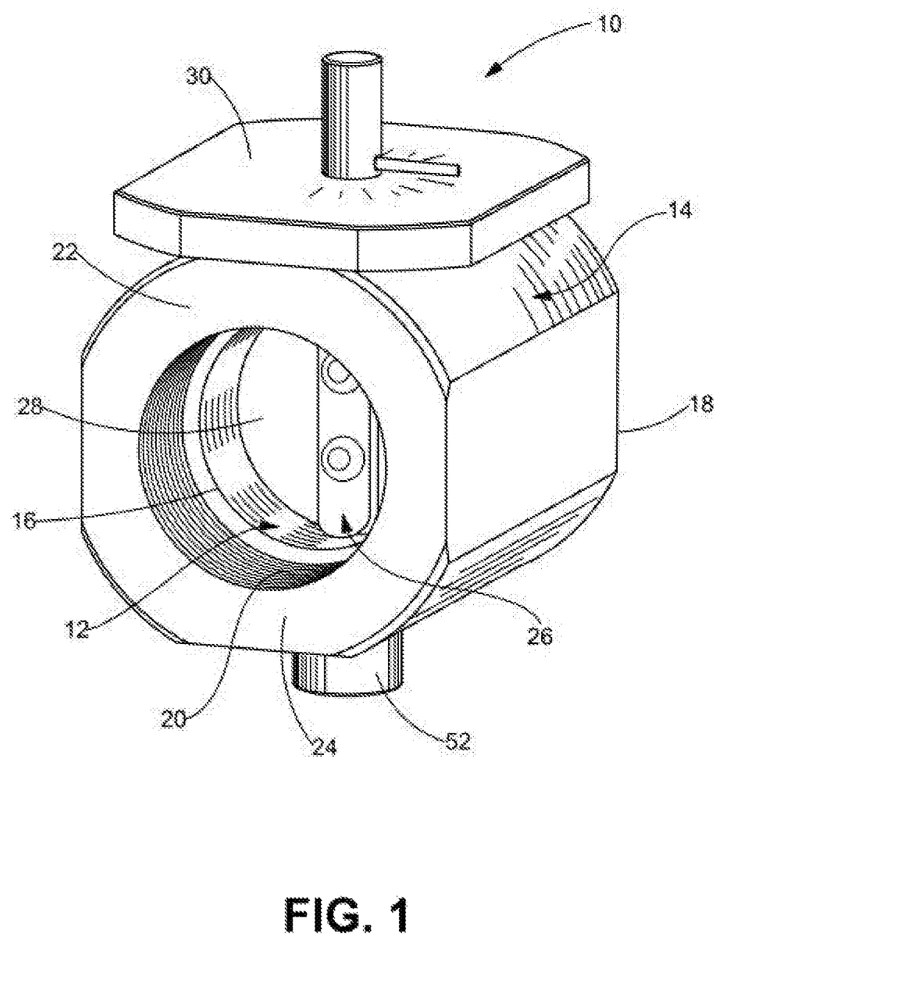
FIG. 1 is a perspective view of a butterfly valve, in accordance with an embodiment of the present disclosure.

Turning now to the drawings and with specific reference to FIG. 1, a butterfly valve 10 is shown. The butterfly valve 10 may be an apparatus configured for controlling gas flow through a bore 12, the bore 12 being defined by a valve body 14 of the butterfly valve 10. Accordingly, the butterfly valve 10 may be employed to limit, throttle, expand, or otherwise control flow of any gas, such as, but not limited to natural gas, butane, propane, air, or any other gas. Gas may enter and exit the bore 12 from any gas sources or gas recipients. For example, gas from a gas source, such as a gas tank, may enter a first end 16 of the bore 12 and may exit the bore 12 at a second end 18 of the bore 12, at which the gas may flow to a gas recipient, such as a combustion device. Any gas source or gas recipient may be connected, in fluid communication, with the butterfly valve 10, via threaded ends 20, which are adjacent to the bore 12.

The valve body 14 includes, at least, a first wall 22 and a second wall 24. As defined herein, the first and second walls 22, 24 are portions of the valve body 14 defined by, at least, one plane in which each wall 22, 24 lies. Additionally, the first and second walls 22, 24 may be portions of a continuous, connected surface of the valve body 14, such as a generally cylindrical surface. The first wall 22 and the second wall 24 may be substantially parallel with respect to one another, meaning that at least one plane in which the first wall 22 lies is parallel with at least one plane in which the second wall 24 lies. Further, in some examples, the first and second wall 22, 24 may be generally parallel to the general direction of gas flow through the bore 12. Disposed between the first wall 22 and the second wall 24, the butterfly valve 10 may further include a shaft 26 and a disk 28, the disk 28 being operatively coupled with the shaft 26. The shaft 26 may be substantially perpendicular to the first wall 22 and the second wall 24. In operative connection with the valve body 14, the shaft 26 may pass through, or otherwise intersect, both the first wall 22 and the second wall 24 and be configured for rotatable motion with respect to the valve body 14. In some examples, the shaft 26 may pass through, or otherwise intersect, a visual indicator 30, which may indicate rotational position of the disk 28, relative to the bore 12, based on a rotational position of the shaft 26, as described, in greater depth, below.

Figure 2:
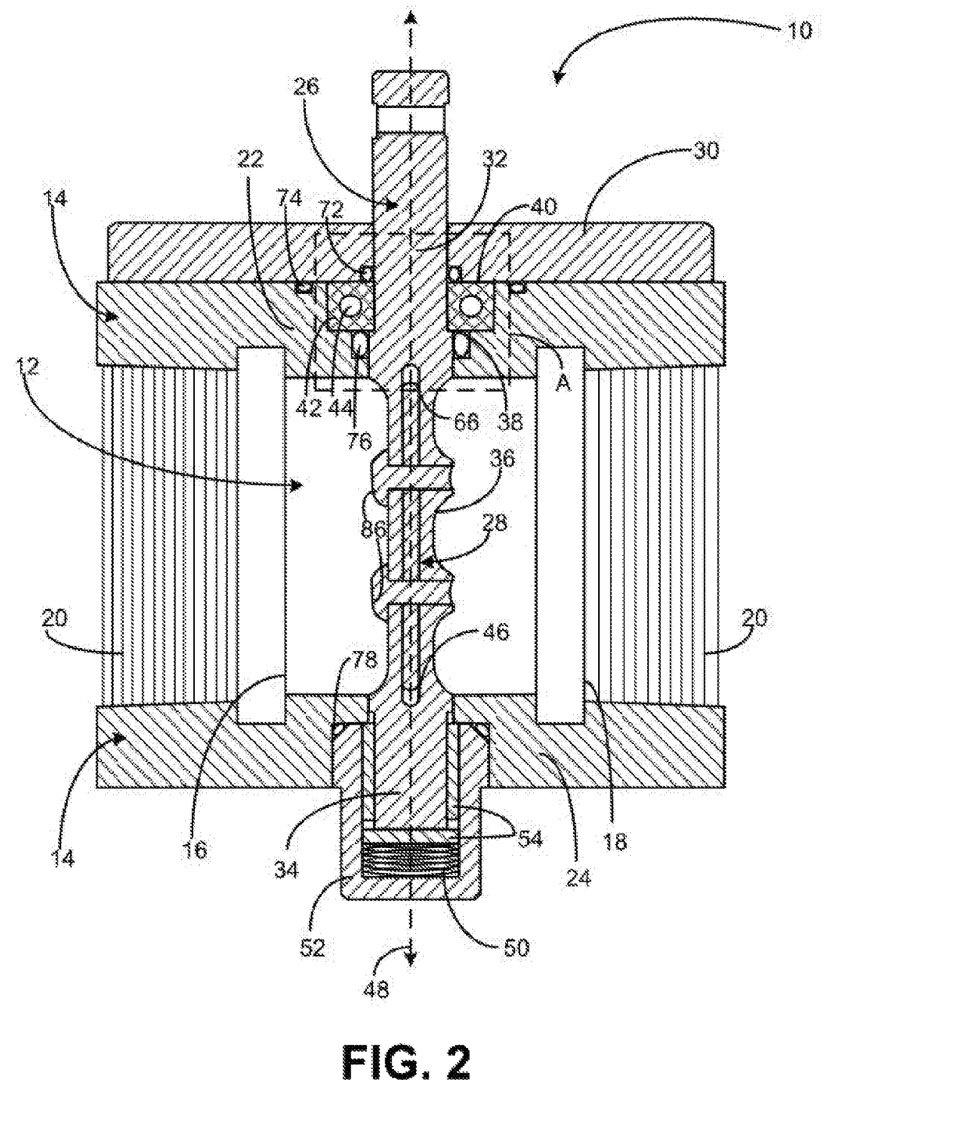
FIG. 2 is a side cross-sectional view of the butterfly valve of FIG. 1 taken along line 2-2 of FIG. 1, in accordance with the present disclosure.

Referring now to the cross-sectional view of the butterfly valve 10 of FIG. 2 and with continued reference to FIG. 1, the shaft 26 may include a first portion 32 intersecting with the first wall 22, a second portion 34 intersecting with the second wall 24, and a center portion 36 disposed within the bore 12. The first portion 32 may include a shoulder 38, which may be configured to abut a ball bearing 40 of the butterfly valve 10, the ball bearing 40 being disposed proximate to the first wall 22 and including a race 42 and a ball 44.

In some examples, the center portion 36 of the shaft 26 may define a disk slot 46. The disk slot 46 may be a slot that is defined by the shaft 26 and configured to have the disk 28 inserted therein, thereby operatively coupling the disk 28 to the shaft 26 via the disk slot 46. In some such examples, the disk slot 46 may be configured to be positioned substantially along a center rotational axis 48 of the shaft 26, thereby positioning the disk 28 approximately in the rotational center of the shaft 26. Positioning the disk 28 in the center of the shaft 26 may provide greater shaft 26 strength and durability.

The butterfly valve 10 further includes a spring 50 or other biasing member disposed proximate to the second wall 24 and the second portion 34 of the shaft 26. Accordingly, the spring 50 may abut the second portion 34 and, in some examples, may be housed and/or secured by a spring plug 52 that is disposed proximate to the second portion 34 and the second wall 24. The spring plug 52 may also, in part, house the second portion 34 of the shaft 26. In some examples, the spring plug 52 may be attached to the second wall 24 by press fitting the spring plug 52 to the second wall 24. To aid in rotation of the shaft 26 within the spring plug 52, in some examples the butterfly valve 10 may include a spring bearing 54 disposed between the shaft 26 and the spring 50, within the spring plug 52.

Figures 3, 4, 5:
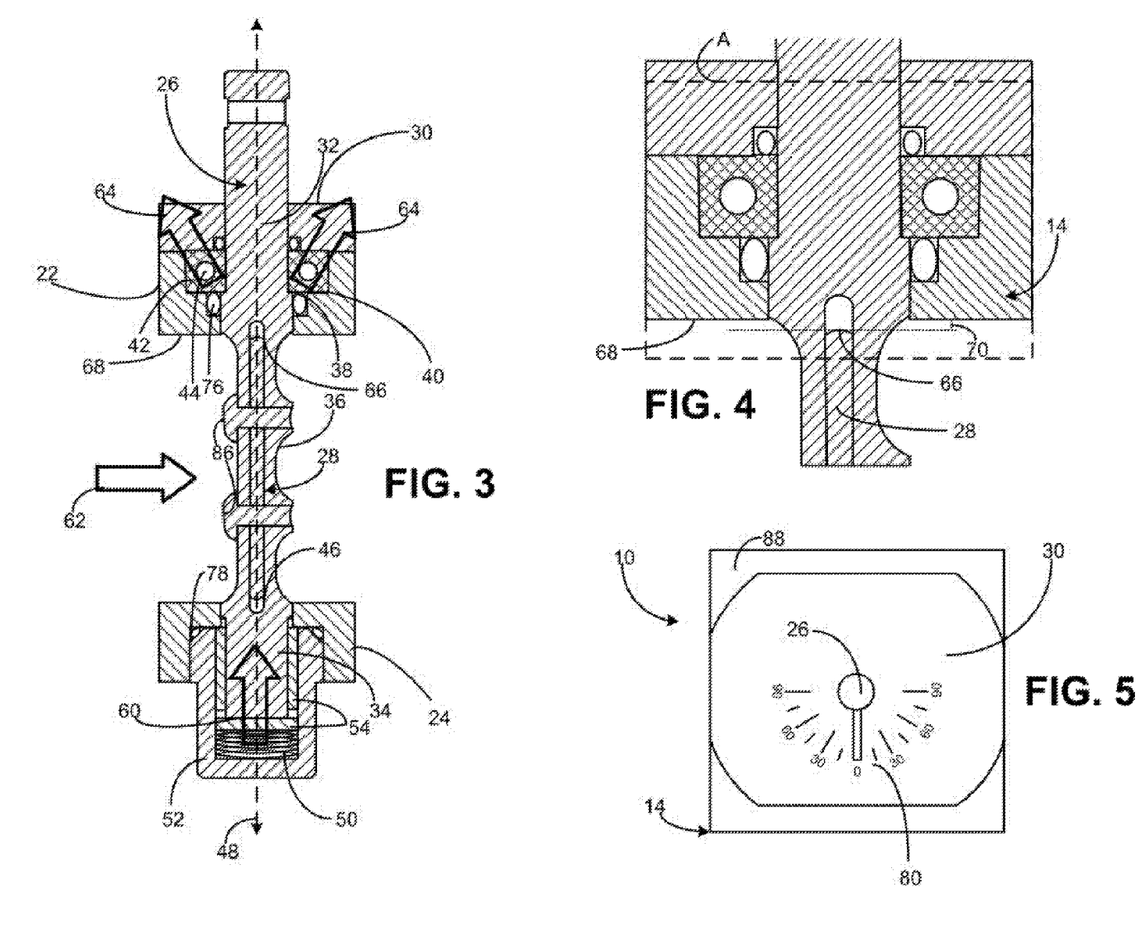
FIG. 3 is a side cross-sectional view of a disk, shaft, bearing, and spring of the butterfly valve, which illustrates forces applied upon said elements of the butterfly valve, in accordance with FIGS. 1-2 and the present disclosure.
FIG. 4 is a magnified view of a portion, signified by the box "A," of the cross-sectional view of the butterfly valve of FIG. 2, in accordance with FIG. 2 and the present disclosure.
FIG. 5 is a top view of the butterfly valve of FIGS. 1-3, illustrating a visual indicator of the butterfly valve, in accordance with an embodiment of the disclosure.

As illustrated in the side cross-sectional view of the disk 28, shaft 26, ball bearing 40, and spring 50 of the butterfly valve 10 in FIG. 3, the spring 50 may be configured to provide an axial force 60 (represented as an arrow in the direction of the force) on the shaft 26, particularly against the second portion 34 in the axial direction (e.g., substantially perpendicular to the bore 12 and/or the direction of gas flow 62 (represented as an arrow in the direction of the flow) in the butterfly valve 10). The axial force 60 may be configured such that it presses the shoulder 38 of the first portion 32 of the shaft 26 against the race 42 of the ball bearing 40. The ball bearing 40 may have little radial play, therefore the axial force 60, when applied to the ball bearing 40 via the shoulder 38, may transfer to the ball bearing 40 as a diagonal force 64 (represented as an arrow in the direction of the force), with respect to the axial force 60 and/or the shaft 26. Utilizing the spring 50 to press the shaft 26 against the ball bearing 40 maintains a constant axial displacement of the shaft 26 relative to the bore 12. By maintaining this constant axial position, an outer edge 66 of the disk 28 may be prevented from contacting an inner wall 68 of the bore 12.

To that end, the axial force 60 may further be configured to press the shoulder 38 against the race 42 of the ball bearing 40 to maintain a clearance gap 70 between the outer edge 66 of the disk 28 and the inner wall 68 of the bore 12. The clearance gap 70 is illustrated in the magnified view of the portion "A," of FIG. 2, as illustrated in FIG. 4. By maintaining the clearance gap 70, the disk 28 is prevented from making contact with the bore 12. Due to the above-described configuration of the spring 50, ball bearing 40, and resultant axial force 60, prevention of the outer edge 66 contacting the bore 12 is possible. In some examples, the clearance gap 70 may be configured to be approximately 0.001 inches, but other dimensions for the clearance gap 70 are certainly possible.

To further prevent gas leakage from the bore 12, the butterfly valve 10 may include one or more seals, such as O-rings, or the like at various locations proximate to one or both of the first wall 22 and the second wall 24. For example, the butterfly valve 10 may include one or both of a first O-ring 72 and a second O-ring 74, which are both located proximate to the first wall 22 and bridging a gap between the first wall 22 and the visual indicator 30. In another example, the butterfly valve 10 may include a third O-ring 76 proximate to the first wall 22, the first portion 32 of the shaft 26, and the ball bearing 40. Further, in some examples, the butterfly valve 10 may include one or more O-rings proximate to one or both of the second wall 24 and the second portion 34 of the shaft 26. For example, the butterfly valve 10 may include a fourth O-ring 78 proximate to the second wall 24 and the spring plug 52, which may bridge a gap between the second wall 24 and the spring plug 52.

Turning now to the overhead view of the butterfly valve 10 of FIG. 5, the visual indicator 30 is shown in greater detail. The visual indicator 30 is configured to provide a visual indication 80 of rotational position of the disk 28. The visual indication 80 of rotational position of the disk 28 may be based on and/or derived from the rotational position of the shaft 26 relative to the valve body 14. In the example embodiment of FIG. 5, the visual indication 80 displays an offset angle, from 0-90 degrees, of the disk 28, relative to a closed position of the disk 28. For example, at an offset angle of 0, the disk 28 is fully closed, in which the disk 28 is substantially perpendicular to the direction of gas flow in the bore 12. Further, in such examples, at an offset angle of 90, the disk 28 is fully opened, in which the disk 28 is substantially parallel to the direction of gas flow in the bore 12. As depicted, in some examples, the visual indicator 30 may provide the visual indication 80 based on clockwise rotation of the shaft 26 and/or the visual indicator 30 may provide the visual indication 80 based on counterclockwise rotation of the shaft 26.

Figure 6:
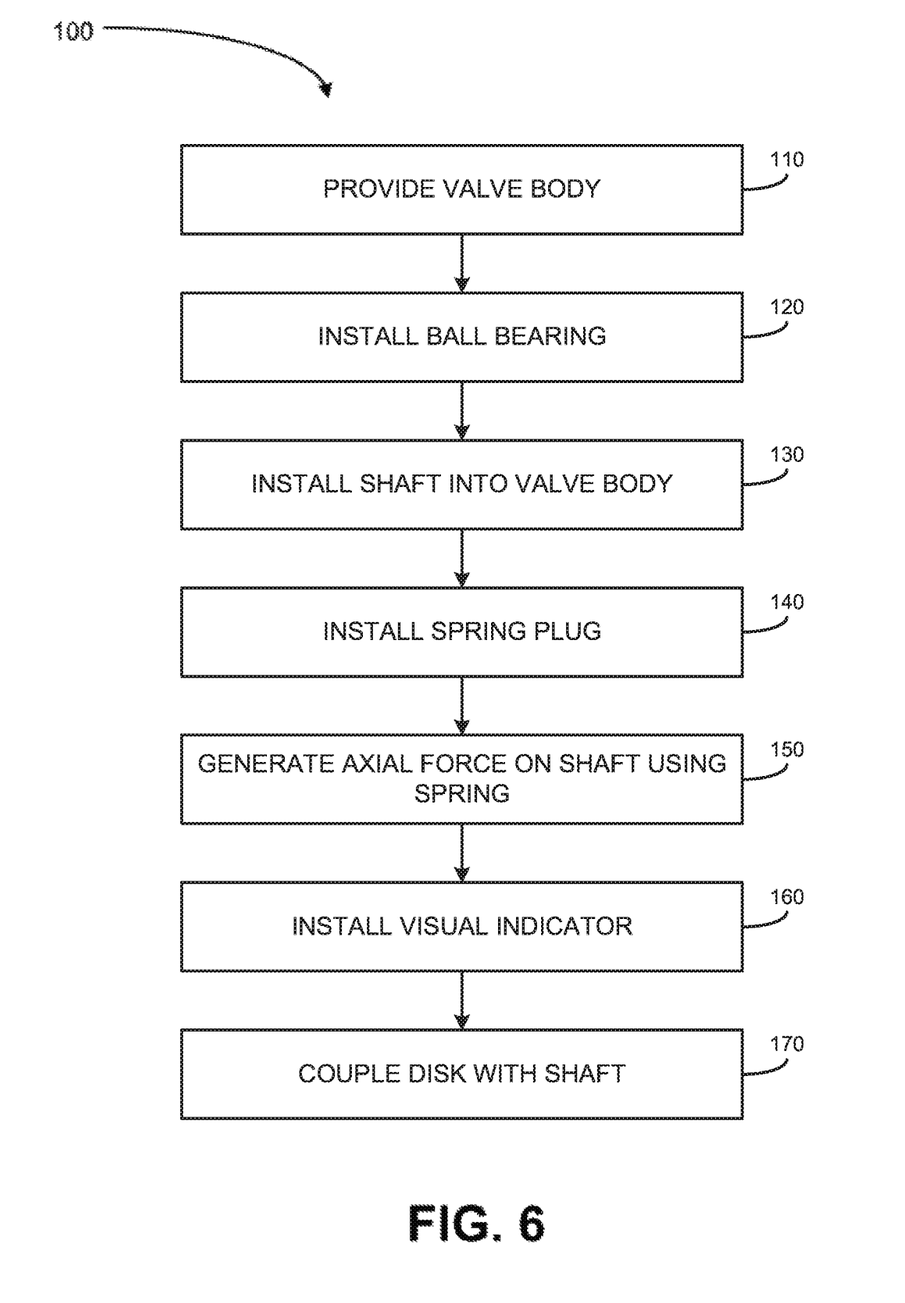
FIG. 6 is a flow chart representative of an example method for manufacturing a butterfly valve, in accordance with the present disclosure.

FIG. 6 illustrates a flowchart for a method 100 for manufacturing a butterfly valve for controlling gas flow, such as, but not limited to, the butterfly valve 10 of FIGS. 1-5. While the elements of FIGS. 1-5 will be referenced, with respect to the method 100, the method 100 does not require use of the specific elements described and depicted herein and any functional equivalents may be substituted in place of the referenced elements.

The method 100 begins at block 110, wherein the valve body 14 is provided. The valve body 14 defines the bore 12 and includes the first wall 22 and the second wall 24. As shown in FIG. 2, the first wall 22 and the second wall 24 may be substantially parallel with respect to one another. The valve body 14 may be formed of any suitable material, such as, but not limited to, aluminum alloy (e.g., Aluminum-6061).

The method 100 may further include installing the ball bearing 40 proximate to the first portion 32 and the first wall 22, as depicted in block 120. In such examples, the ball bearing 40 may be installed via press fitting one or more components of the ball bearing 40, into the valve body 14; however, any other suitable installation techniques, known in the art, may be used to install the ball bearing 40. At block 130, the method 100 may feature installing the shaft 26 into the valve body 14 by disposing the shaft 26, within the bore 12, substantially perpendicular to the first and second walls 22, 24, disposing the first portion 32 of the shaft 26 to intersect with the first wall 22, disposing the second portion 34 of the shaft 26 to intersect with the second wall 24, and disposing the center portion 36 of the shaft 26 to lie within the bore 12. The shaft 26, upon installation, is configured for rotatable motion with respect to the valve body 14.

Upon installation of the shaft 26, in some further examples, the method 100 may include installing the spring plug 15 proximate to the second wall 24 and the second portion 34, the spring plug 52 housing the spring 50, as depicted by block 140. In such examples, the spring plug 52 may be installed by press fitting the spring plug 52 to the second wall 24 however, any other suitable installation techniques, known in the art, may be used to install the spring plug 52. With the ball bearing 40, shaft 26, and, in some examples, spring plug 52 disposed relative to the valve body 14, the method 100 may include generating the axial force 60 upon the second portion 34 using the spring 50, as depicted in block 150. The axial force 60 is configured to press the shoulder 38 against the race 42 will prevent the outer edge 66 of the disk 28 from contacting the inner wall 68 of the bore 12, once the disk 28 is installed.

Further, in some other examples, the method 100 may include installing the visual indicator 30 on an outer surface 88 of the first wall 22 of the valve body 14, as depicted in block 160.

The method 100 may include coupling the disk 28, in operable fashion, with the center portion 36 of the shaft 26, wherein the disk 28 is configured to control gas flow through the bore 12 based on a rotational position of the shaft 26 relative to the valve body 14, as depicted in block 170. In some examples, coupling the disk 28 with the center portion 36 of the shaft 26 includes fastening the disk 28 to the shaft 26 using a fastener 86. While any suitable material may be used to form the shaft 26 and/or the disk 28, in some examples, one or both of the shaft 26 and the disk 28 may be formed of stainless steel.

Of course, the steps of the method 100 need not be performed in the aforementioned and depicted order and may be performed in any order suitable for manufacturing a butterfly valve.

INDUSTRIAL APPLICABILITY

The present disclosure relates to apparatus for controlling fluid flow and, more particularly, relates to butterfly valves utilized for controlling gas flow. The disclosed apparatus may be employed to limit, throttle, expand, or otherwise control flow of any gas, such as, but not limited to natural gas, butane, propane, air, or any other gas and the disclosed methods may be utilized to manufacture such apparatus. Further, the disclosed apparatus may be used in conjunction with devices that rotate the shaft and/or allow rotation of the shaft by an outside actor (e.g., a crank, an actuator, etc.), which cause rotation of the disk within the pipe or bore of the valve.

The butterfly valve 10 disclosed herein may be particularly advantageous due to utilization of the spring 50 or other biasing member to press the shaft 26 against the ball bearing 40, which may cause a constant axial displacement of the shaft 26, relative to the bore 12, to be maintained. By maintaining this constant axial position, the outer edge 66 of the disk 28 is prevented from contacting the bore 12. Accordingly such utilization of the spring 50 may maintain a clearance gap 70 between the outer edge 66 of the disk 28 and the bore 12, which may prevent the disk 28 from making contact with the bore 12. By preventing such contact and maintaining constant axial positioning of the shaft 26, functionality, flow capacity, pressure limitations, product durability, flow accuracy, and/or cost effectiveness of the butterfly valve 10 may be improved.

It will be appreciated that the present disclosure provides butterfly valves for controlling gas flow, methods for manufacturing butterfly valves for controlling gas flow, and apparatus for controlling gas flow. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for manufacturing a butterfly valve, the butterfly valve for controlling gas flow, the method comprising:
   providing a valve body, the valve body defining a bore and including, at least, a first wall and a second wall, the first wall and the second wall being substantially parallel with respect to one another;
   installing a shaft into the valve body by disposing the shaft, within the bore, substantially perpendicular to the first and second walls, disposing a first portion of the shaft to intersect with the first wall, disposing a second portion of the shaft to intersect with the second wall, and disposing a center portion of the shaft to lie within the bore, the shaft configured for rotatable motion with respect to the valve body;
   installing a ball bearing proximate to the first portion of the shaft and the first wall, the ball bearing including a ball and a race;
   coupling a disk, in operable fashion, with the center portion of the shaft, the disk configured to control gas flow through the bore based on a rotational position of the shaft relative to the valve body; and
   generating an axial force upon the second portion of the shaft using a spring disposed proximate to the second portion of the shaft and the second wall, the axial force configured to press a shoulder of the first portion of the shaft against the race of the ball bearing to prevent an outer edge of the disk from contacting an inner wall of the bore.

2. The method of claim 1, further comprising installing a spring plug proximate to the second wall and the second portion of the shaft, the spring plug housing the spring.

3. The method of claim 2, wherein the spring plug is installed by press fitting the spring plug to the second wall.

4. The method of claim 1, wherein coupling the disk with the center portion of the shaft includes fastening the disk to the shaft using a fastener.

5. The method of claim 1, installing a visual indicator on an outer surface of the first wall of the valve body, the visual indicator operatively coupled with the shaft and configured to provide a visual indication of disk rotational position based on shaft rotational position.

6. A butterfly valve for controlling gas flow, the butterfly valve comprising:
   a valve body, the valve body defining a bore and including, at least, a first wall and a second wall, the first wall and the second wall being substantially parallel with respect to one another;
   a shaft disposed substantially perpendicular to the first and second walls and configured for rotatable motion with respect to the valve body, the shaft including a first portion, a second portion, and a center portion, the first portion including a shoulder and intersecting with the first wall, the second portion intersecting with the second wall, and the center portion disposed within the bore;
   a disk housed within the bore, operatively coupled with the center portion of the shaft, and configured to control gas flow through the bore based on a rotational position of the shaft relative to the valve body;
   a ball bearing operatively coupled with the first portion of the shaft and disposed proximate to the first wall, the ball bearing including a ball and a race; and
   a spring disposed proximate to the second wall and the second portion of the shaft and configured to provide an axial force on the shaft, the axial force configured to press the shoulder of the first portion of the shaft against the race of the ball bearing to prevent an outer edge of the disk from contacting an inner wall of the bore.

7. The butterfly valve of claim 6, wherein the axial force is further configured to press the shoulder of the first portion of the shaft against the race of the ball bearing to maintain a clearance gap between the outer edge of the disk and the inner wall of the bore.

8. The butterfly valve of claim 7, wherein the clearance gap maintained is approximately 0.001 inches.

9. The butterfly valve of claim 6, further comprising a spring plug, the spring plug disposed proximate to the second portion of the shaft and the second wall, the spring plug housing the spring and, in part, the second portion.

10. The butterfly valve of claim 9, further comprising one or more spring plug bearings disposed proximate to the spring plug and between the spring plug and the second portion of the shaft.

11. The butterfly valve of claim 9, further comprising one or more O-rings disposed proximate to the spring plug and configured to prevent gas leakage from the butterfly valve.

12. The butterfly valve of claim 9, wherein the spring plug is attached to the second wall of the valve housing by press fitting the spring plug to the second wall.

13. The butterfly valve of claim 6, wherein the shaft defines a disk slot and the disk is operatively coupled to the shaft by inserting the disk into the disk slot and fastening the disk to the shaft.

14. The butterfly valve of claim 13, wherein the disk slot is configured to be positioned proximately about a center rotational axis of the shaft.

15. The butterfly valve of claim 6, further comprising a visual indicator operatively coupled with the shaft and configured to provide a visual indication of disk rotational position based on shaft rotational position.

16. The butterfly valve of claim 15, wherein the visual indicator is configured to provide the visual indication of disk rotational position based on one or both of clockwise and counterclockwise rotation of the shaft.

17. The butterfly valve of claim 6, further comprising one or more O-rings proximate to the first end of the shaft and configured to prevent gas leakage from the butterfly valve.

18. The butterfly valve of claim 6, further comprising one or more O-rings proximate to the first wall of the valve body and configured to prevent gas leakage from the butterfly valve.

19. The butterfly valve of claim 6, wherein the valve body defines one or more threaded input ports configured for attachment to one or both of a gas source and a gas recipient.

20. An apparatus for controlling gas flow, the apparatus comprising:
- a valve body, the valve body defining a bore and including, at least, a first wall and a second wall, the first wall and the second wall being substantially parallel with respect to one another;
- a shaft disposed substantially perpendicular to the first and second walls and configured for rotatable motion with respect to the valve body, the shaft including a first portion, a second portion, and a center portion, the first portion including a shoulder and intersecting with the first wall, the second portion intersecting with the second wall, and the center portion disposed within the bore, and the shaft defining a disk slot positioned proximately about a center rotational axis of the shaft;
- a disk housed within the bore, operatively coupled with the center portion of the shaft via the disk slot, and configured to control gas flow through the bore based on a rotational position of the shaft relative to the valve body;
- a ball bearing operatively coupled with the first portion of the shaft and disposed proximate to the first wall, the ball bearing including a ball and a race;
- a spring disposed proximate to the second wall and the second portion of the shaft and configured to provide an axial force on the shaft, the axial force configured to press the shoulder of the first portion of the shaft against the race of the ball bearing to prevent an outer edge of the disk from contacting an inner wall of the bore; and
- a spring plug, the spring plug disposed proximate to the second portion of the shaft and the second wall, the spring plug housing the spring and, in part, the second portion.

* * * * *

UNITED STATES PATENT AND TRADEMARK OFFICE
CERTIFICATE OF CORRECTION

PATENT NO. : 9,915,352 B2
APPLICATION NO. : 15/227636
DATED : March 13, 2018
INVENTOR(S) : Peter S. Pinto Page 1 of 1

It is certified that error appears in the above-identified patent and that said Letters Patent is hereby corrected as shown below:

On the Title Page

Item (71), Column 1 delete the words "Siemens Combustion Controls Inc." and substitute therefore --SCC, Inc.--.

Signed and Sealed this
Twelfth Day of June, 2018

Andrei Iancu
*Director of the United States Patent and Trademark Office*